United States Patent Office 3,287,102
Patented Nov. 22, 1966

3,287,102
HERBICIDAL COMPOSITION AND METHOD
EMPLOYING THIOOXANILONITRILES
John F. Olin, St. Louis County, Mo., assignor to Monsanto
Company, St. Louis, Mo., a corporation of Delaware
No Drawing. Filed Apr. 6, 1964, Ser. No. 357,739
14 Claims. (Cl. 71—2.3)

This invention relates to herbicidal compositions and to methods for controlling undesirable plant growth. In one major aspect, this invention relates to heribicidal compositions containing as an essential active ingredient, a thiooxanilonitrile. In another major aspect, this invention relates to methods for controlling undesirable plant growth by applying to said plant growth a growth inhibiting amount of a thiooxanilonitrile.

In recent years, the use of chemicals for controlling various plant systems has found widespread acceptance among agriculturalists. For example, chemical compositions have previously been applied to the soil or to the foliage of fully developed plants, thereby destroying certain types of plants in a selected manner and allowing others to continue their growth in a more favorable environment. This type of control, enabling certain plants to grow freely, unhampered by competing noxious plants, has also been achieved by the application of chemical compositions to the soil, which chemical compositions either prevent germination of undesirable seeds or destroy the emerging seedlings immediately after germination. Very effective control and protection of desirable plant life is therefore possible through the use of chemicals formulated to provide protection as selective herbicides. However, all requirements for effectiveness and selectivity among herbicides have not been satisfied. There are still many demands to satisfy, either for more effective herbicides with a greater selectivity than an old herbicide, or for herbicides with a different selectivity.

It is a primary object of this invention to provide herbicidal compositions selectively active in pre-emergent application or foliar contact. It is a further object of this invention to provide methods for the suppression and control of undesirable plant life. It is a further object of this invention to provide compositions and methods useful in the selective destruction of existing plant growth. It is still another object of this invention to provide compositions and methods useful in preventing the growth of undesirable plant systems. Additional objects, benefits and advantages will become apparent as the detailed description of the invention proceeds.

Compounds useful in the practice of the present invention are those having the molecular configuration:

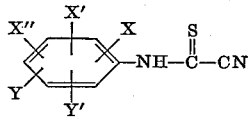

where X, X' and X" are hydrogen or halogen radicals, and Y and Y' are hydrogen, hydroxy, halogen, alkyl, alkoxy or nitro radicals.

The thiooxanilonitriles useful in the practice of this invention can contain an unsubstituted phenyl group attached to the nitrogen atom, as for example, thiooxanilonitrile. The present invention also encompasses compounds containing substituents on the aromatic ring in either the ortho, meta or para position. Furthermore, combinations of ortho and meta, ortho and para, meta and para, di-meta, di-ortho and ortho, meta and para substitutions are within the scope of this invention.

Substitutions on the ring can range to as high as five substituents, the type of substituents being limited as characterized in the above formula. Substituents can consist of halogen radicals, particularly chlorine, of nitro radicals, of hydroxyl radicals, and of alkyl and alkoxy radicals. Preferably the alkyl and alkoxy radicals have from one to four carbon atoms. Compounds illustrative of these many possible substitutions include 2-methoxy-3,4-dichloro-6-ethylthiooxanilonitrile, 2-methyl-3,4-dichlorothiooxanilonitrile, 2,4-dibromo-3-hydroxy-6-chlorothiooxanilonitrile, 2,4,5-trichlorothiooxanilonitrile, 4-isopropylthiooxanilonitrile, 2-fluoro-3,4-diethoxythiooxaniloni-trile, 2-iodo-4-nitrothiooxanilonitrile, 2-methoxy-3-nitro-5-chlorothiooxanilonitrile, 3-nitro-4-tert-butylthiooxanilonitrile, and 2-methyl-3,4-dibromothiooxanilonitrile.

Compounds of this invention possess herbicidal activity. The most distinctive utility of the thiooxanilonitriles is their ability to inhibit or destroy existing plant growth in a selective manner. The herbicidal activity can be demonstrated by contacting an established plant structure with the subject compounds. In addition to contact herbicidal activity, some of the compounds of this invention are active as pre-emergence herbicides. Some of the compounds are active both as pre-emergence and contact herbicides. Hence the user can benefit from the application of these compounds in a dual manner depending upon the thiooxanilonitrile selected.

Thiooxanilonitriles preferred for use as contact herbicides are those compounds of the formula

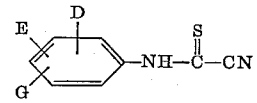

where D is a hydrogen, chloro, or alkyl radical having from one to four carbon atoms, E is a hydrogen, chloro, nitro or alkyl radical having from one to four carbon atoms, and G is a hydrogen, hydroxy, or alkoxy radical having from one to four carbon atoms. Examples include 2,3-dichloro-5-ethoxythiooxanilonitrile, 2-nitro-4-hydroxy-5-chlorothiooxanilonitrole, 2-tert-butyl-3-methoxythiooxanilonitrile, 2,3-dimethyl-4-methoxythiooxanilonitrile, and 4-ethoxythiooxanilonitrile.

Particularly preferred for use as contact herbicides are thiooxanilonitriles of the formula

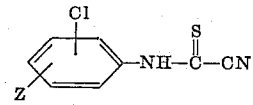

where Z is a hydrogen, chloro or alkyl radical having from one to four carbon atoms. Examples include 2-chlorothiooxanilonitrile, 3-chlorothiooxanilonitrile, 4,5-dichlorothiooxanilonitrile, 2,4-dichlorothiooxanilonitrile, 3-ethyl-4-chlorothiooxanilonitrile, and 2-tert-butyl-3-chlorothiooxanilonitrile.

The thiooxanilonitriles are prepared by reacting the appropriately substituted phenyl isothiocyanate with a cyanide and subsequently acidifying the product to produce the corresponding thiooxanilonitrile.

The advantages and benefits of the present invention will become more fully understood when interpreted in view of the detailed description set forth in the following examples.

EXAMPLE 1

A quantity of 38 grams of potassium cyanide was dissolved in 100 ml. of water. To this solution was added 102.5 grams (0.5 mole) of 2-tert-butyl-6-methylphenylisothiocyanate and 400 ml. of 1,2-dimethoxyethane. The mixture was stirred for twenty hours at room temperature, diluted with 500 ml. of water, and acidified with HCl. An orange oil precipitated from solution and was removed. The oil was washed with water, dried over a dessicant, and crystallized from 300 ml. of n-heptane as a bright yellow powder. Melting point of the product was 117° to 118° C. The product, identified as 2-tert-butyl-6-methylthiooxanilonitrile, has a calculated elemental analysis as follows for $C_{13}H_{16}N_2S$: C, 67.20%; H, 6.94%; S, 13.80%. Analytical results for the product are C, 67.18%; H, 7.08%; S, 13.80%.

EXAMPLE 2

A quantity of 80 grams of 4-methoxy-2-nitrophenyl isothiocyanate dissolved in 250 grams of 1,2-dimethoxyethane was placed in a 2 liter flask containing a solution of 38 grams of potassium cyanide dissolved in 300 ml. of water. The mixture was heated to 35° C., then cooled to 25° and stirred for ½ hour. The mixture was diluted with 500 ml. of water and acidified with 50 ml. of concentrated HCl to precipitate a brick-red solid. The precipitate was filtered, washed with water and dried. The final product was an orange powder, having a melting point of 135° to 136° C. The product, identified as 4-methoxy-2-nitrothiooxanilonitrile, has a calculated elemental analysis as follows for $C_9H_7N_3O_3S$: C, 45.70%; H, 2.98%; S, 13.46%. Analytical results for the product are C, 45.73%; H, 3.17%; S, 12.98%.

EXAMPLE 3

A quantity of 96 grams of 2,5-dichlorophenyl isothiocyanate, together with 250 ml. of methanol, was added to a flask containing 37 grams of potassium cyanide dissolved in 150 ml. of water. The mixture was cooled to about 10° C. and stirred for 3½ hours. Upon acidification with cold dilute (1:10) HCl, a yellow solid precipitated. The solid was filtered, washed with water, and air dried. Melting point of the product, identified as 2,5-dichlorothiooxanilonitrile, was 135° C. to 137° C. with decomposition. The washed and dried product had an orange color. Calculated elemental analysis for $C_8H_4Cl_2S$ was C, 41.58%; H, 1.74%; S, 13.87%. Analytical results for the product were C, 41.58%; H, 1.79%; S, 13.82%.

EXAMPLE 4

A quantity of 112.5 grams of 3,5-dichlorophenyl isothiocyanate, together with 200 ml. of 1,2-dimethoxyethane, was added to a flask containing 42 grams of potassium cyanide dissolved in 700 ml. of a 50/50 methanol/water mixture. The mixture was cooled to about 15° C. and agitated vigorously for 10 hours. Upon acidification with dilute HCl, a yellow-tan solid was precipitated. The solid was filtered, washed with water, and dried. Upon crystallization from a toluene-heptane mixture, the product was obtained as large, greenish-brown crystals, having a melting point of 144° to 147° C. with decomposition. The product, identified as 3,5-dichlorothiooxanilonitrile, has a calculated elemental analysis as follows for $C_8H_4Cl_2N_2S$: C, 41.58%; H, 1.74%; S, 13.87%. Analytical results for the product are C, 41.70%; H, 1.78%; S, 13.84%.

EXAMPLE 5

The compound 3,5-dichloro-4-hydroxythiooxanilonitrile was prepared according to the procedure described in Example 4 by reacting 3,5-dichloro-4-hydroxyphenyl isothiocyanate with potassium cyanide. The product was a yellow-brown solid with no sharp melting point, becoming increasingly dark on heating. Calculated elemental analysis for $C_8H_4Cl_2N_2OS$ was C, 38.88%; H, 1.63%; Cl, 28.70%. Analytical results for the product are C, 38.79%; H, 1.65%; Cl, 30.56%.

EXAMPLE 6

The compound 2-methoxy-3,4,5,6-tetrachlorothiooxanilonitrile was prepared according to the procedure described in Example 4 by reacting 2-methoxy-3,4,5,6-tetrachlorophenyl isothiocyanate with potassium cyanide. The product was crystallized from 80% methanol as a yellow-orange solid with a metling point of 150° C. with decomposition. Calculated elemental analysis for $C_9H_4Cl_4N_2OS$ was C, 32.75%; H, 1.22%; S, 9.70%. Analytical results for the product are C, 33.13% H, 1.76%; S, 8.45%.

EXAMPLE 7

The compound 2,3-dichlorothiooxanilonitrile was prepared according to the procedure described in Example 4 by reacting 2,3-dichlorophenyl isothiocyanate with potassium cyanide. The product was crystallized from toluene to yield an orange powder with a melting point of 147° to 148° C. with decomposition.

EXAMPLE 8

The compound 4-chlorothiooxanilonitrile was prepared according to the procedure described in Example 4 by reacting 4-chlorophenyl isothiocyanate with potassium cyanide. The product was a yellow powder with a melting point of 121° to 123° C. with decomposition. Calculated elemental analysis for $C_8H_5ClN_2S$ was C, 48.86%; H, 2.56%; S, 16.31%. Analytical results for the product are C, 48.74%; H, 2.61%; S, 16.39%.

EXAMPLE 9

The compound 2-tert-butyl-4,5-dichlorothiooxanilonitrile was prepared according to the procedure described in Example 4 by reacting 2-tert-butyl-4,5-dichlorophenylisocyanate with potassium cyanide. The product, a bright orange powder, had a melting point of 164° C. with decomposition. Calculated elemental analysis for the product is C, 50.18; H, 4.21%; S, 11.16%. Analytical results for the product are C, 50.12%; H, 4.37%; S, 10.89%.

EXAMPLE 10

The compound 3-chlorothiooxanilonitrile was prepared according to the procedure described in Example 4 by reacting 3-chlorophenyl isothiocyanate with potassium cyanide. The product, an orange powder, had a melting point of 88° to 89° C. Calculated elemental analysis for $C_8H_5ClN_2S$ was C, 48.88%; H, 2.56%; S, 16.31%. Analytical results for the product are C, 48.84% H, 2.61%; S, 16.53%.

EXAMPLE 11

The compound 3-chloro-2-methylthiooxanilonitrile was prepared according to the procedure described in Example 4 by reacting 3-chloro-2-methylphenyl isothiocyanate with potassium cyanide. The product, a yellow-orange solid, upon crystallization from a toluene/heptane mixture, had a melting point of 85° C. Calculated elemental analysis for $C_9H_7ClN_2S$ is C, 51.30%; H, 3.35%; S, 15.22%. Analytical results for the product are C, 51.73%; H, 3.65%; S, 15.09%.

EXAMPLE 12

The compound 2-chloro-thiooxanilonitrile was prepared according to the procedure described in Example 4 by reacting 2-chlorophenyl isothiocyanate with potassium cyanide. The product, an orange powder, had a melting point of 108° to 110° C. with decomposition. Calculated elemental analysis for $C_8H_5ClN_2S$ is C, 48.86; H, 2.56%; S, 16.31%. Analytical results for the product are C, 48.79; H, 2.71%; S, 16.20%.

EXAMPLE 13

In this example, the contact herbicidal activity of selected thiooxanilonitriles in greenhouse tests is reported.

The plants on which the thiooxanilonitriles were tested are designated in Table I as follows:

A=grass
B=broadleaf
C=morning glory
D=wild oats
E=brome grass
F=rye grass
G=radish
H=sugar beet
I=cotton
J=corn
K=foxtail
L=barnyard grass
M=crabgrass
N=pigweed
O=soybean
P=wild buckwheat
Q=tomato
R=sorghum
S=rice The thiooxanilonitriles to be tested were applied in spray form to plants according to the following testing procedure. A good grade of topsoil was placed in aluminum pans to a depth of ⅜ to ½ inch from the top of the pan. On the top of the soil were placed a designated number of seeds of each of the plant species listed above. The seeds were covered by overfilling the pan with soil and striking it level. The pans were placed on a greenhouse bench where they were watered from below as needed to give adequate moisture for germination and growth.

The planted pans were maintained on the greenhouse bench under ordinary conditions of sunlight and watering for approximately 14 days. The age of the plants was varied in the testing to compensate for the difference in growth rates for different seasons of the year. Since the thiooxanilonitriles were tested at different times of the year, the age difference of the plants was necessary to insure uniformity of response to the herbicides. After the proper growing period had elapsed, the plants were sprayed with 6 ml. of a 0.5% solution of the appropriate thiooxanilonitriles, which corresponds to an application rate of approximately nine lbs. per acre. Secondary testing was performed on some compounds using 0.2%, 0.05%, and 0.02% solutions of the thiooxanilonitriles, which correspond to application rates of approximately four lbs. per acre, one lb. per acre, and 0.4 lb. per acre, respectively. The herbicidal activity was measured and recorded approximately 14 days after the spraying according to the following scale:

0=no phytotoxicity
1=slight phytotoxicity
2=moderate phytotoxicity
3=severe phytotoxicity
4=plant dead.

The numbered compositions appearing in the table below refer to the compositions prepared in the examples of corresponding number.

Data obtained from tests conducted in this manner are reported in Table I. In some of the evaluations, activity was of a general nature with specific species showing higher activity. In such a case, the summary ratings for grass species (monocotyledon plants) and broadleaf species (dicotyledon plants) were recorded and those species showing activity above the average were noted.

*Table I*

| Composition | Concentration, percent | A | B | C | D | E | F | G | H | I | J | K | L | M | N | O | P | Q | R | S |
|---|---|---|---|---|---|---|---|---|---|---|---|---|---|---|---|---|---|---|---|---|
| 1 | 0.5 | 0 | 2 | 0 | 1 | 1 | 1 | 4 | 4 | | | | | 1 | 4 | 1 | 3 | 4 | 0 | |
| | 0.2 | 0 | 0 | 0 | 0 | 0 | 0 | 0 | 1 | 0 | 0 | 0 | 0 | 0 | 4 | 1 | 0 | 4 | 0 | 1 |
| | 0.05 | 0 | 0 | 0 | 0 | 0 | 0 | 1 | 2 | 0 | 0 | 0 | 0 | 0 | 3 | 0 | 1 | 1 | 1 | 1 |
| 2 | 0.5 | 0 | 2 | 0 | 0 | 0 | 0 | 4 | 3 | | | 1 | | 1 | 4 | | 2 | 4 | 0 | |
| 3 | 0.5 | 2 | 3 | 4 | 2 | 2 | 2 | 4 | 4 | | | 4 | | 3 | 4 | 2 | 4 | 4 | 1 | |
| | 0.2 | 2 | 2 | 2 | 2 | 3 | 2 | 4 | 4 | 1 | 2 | 4 | 0 | 2 | 4 | 1 | 4 | 4 | 3 | 1 |
| | 0.05 | 0 | 2 | 1 | 0 | 0 | 0 | 4 | 2 | 1 | 0 | 2 | 0 | 0 | 4 | 1 | 4 | 4 | 0 | 0 |
| 4 | 0.5 | 2 | 3 | 4 | 1 | 2 | 3 | 4 | 4 | | | 4 | | 3 | 4 | 1 | 4 | 4 | 2 | |
| | 0.2 | 1 | 3 | 2 | 2 | 2 | 2 | 4 | 4 | 3 | 3 | 3 | 1 | 2 | 4 | 3 | 4 | 4 | 1 | 2 |
| | 0.05 | 0 | 2 | 0 | 0 | 0 | 0 | 3 | 3 | 1 | 0 | 0 | 0 | 0 | 4 | 1 | 4 | 4 | 0 | 0 |
| 5 | 0.5 | 1 | 1 | | | | | | | | | | | | 4 | | | 4 | | |
| 6 | 0.5 | 1 | 3 | 4 | 2 | 1 | 1 | 4 | 3 | | | 2 | | 2 | 4 | 2 | 4 | 4 | 2 | |
| | 0.2 | 1 | 2 | 0 | 2 | 3 | 3 | 3 | 3 | 2 | 2 | 2 | 1 | 2 | 4 | 1 | 4 | | 2 | 1 |
| 7 | 0.5 | 3 | 3 | 3 | 3 | 3 | 2 | 4 | 4 | | | 4 | | 4 | 4 | 3 | 4 | 4 | 4 | |
| | 0.2 | 1 | 3 | 4 | 1 | 2 | 1 | 4 | 4 | 3 | 4 | 2 | 0 | 3 | 4 | 3 | 4 | 4 | 2 | 1 |
| | 0.05 | 1 | 1 | | | | | | | | 2 | | | 4 | | | 4 | | | |
| | 0.02 | 0 | 1 | 0 | | 0 | 0 | 3 | 1 | 0 | 1 | 0 | 0 | 0 | 2 | 0 | 0 | 4 | 0 | 0 |
| 8 | 0.5 | 2 | 3 | 4 | 3 | 3 | | 4 | 4 | | | 4 | | 3 | 4 | 3 | 4 | 4 | 4 | |
| | 0.2 | 2 | 3 | 4 | 3 | 3 | 1 | 4 | 4 | 3 | 4 | 4 | 3 | 3 | 4 | 3 | 4 | 4 | 3 | 2 |
| | 0.05 | 1 | 2 | 2 | 0 | 1 | 0 | 3 | 3 | 1 | 2 | 2 | 1 | 3 | 4 | 2 | 4 | 4 | 1 | 1 |
| 10 | 0.5 | 3 | 3 | 4 | 3 | 2 | 3 | 4 | 4 | | | 4 | | 3 | 4 | 3 | 4 | 4 | 4 | |
| | 0.2 | 1 | 3 | 4 | 0 | 1 | 0 | 4 | 4 | 3 | 3 | 3 | 2 | 2 | 4 | 2 | 4 | 4 | 2 | 1 |
| | 0.05 | 0 | 2 | 1 | 0 | 0 | 0 | 2 | 4 | 1 | 1 | 0 | 1 | 0 | 4 | 1 | 1 | 4 | 0 | 0 |
| 11 | 0.5 | 0 | 3 | 3 | 0 | 1 | 0 | 3 | 4 | | | 1 | | 2 | 4 | 2 | 4 | 4 | 1 | |
| | 0.2 | 1 | 3 | 3 | 2 | 2 | 1 | 4 | 4 | 3 | 3 | 3 | 3 | 2 | 4 | 3 | 4 | 4 | 0 | 1 |
| | 0.05 | 0 | 2 | 1 | 0 | 0 | 0 | 3 | 4 | 1 | 0 | 2 | 0 | 2 | 4 | 1 | 4 | 4 | 1 | 0 |
| | 0.02 | 1 | 0 | | | 0 | 0 | | | | | | | 3 | | | 3 | | | |
| 12 | 0.5 | 2 | 3 | 4 | 3 | 2 | | 4 | 4 | | | 4 | | 3 | 4 | 3 | 4 | 4 | 3 | |
| | 0.2 | 2 | 3 | 1 | 1 | 2 | 1 | 4 | 4 | 2 | 2 | 4 | 2 | 4 | 4 | 2 | 4 | 4 | 2 | 1 |
| | 0.05 | 1 | 1 | 0 | 0 | 0 | 0 | 0 | 0 | 0 | 0 | 0 | 0 | 0 | 4 | 0 | 0 | 4 | 0 | 0 |

EXAMPLE 14

In this example, the pre-emergence herbicidal activity of selected thiooxanilonitriles in greenhouse tests is reported. The seeds on which the thiooxanilonitriles were tested were seeds of the same plants set forth in Example 13. In the testing procedure, a good grade of topsoil was placed in aluminum pans to a depth of ⅜ to ½ inch from the top of the pan. On the top of the soil were placed a designated number of seeds of each of the plant species listed above. The seeds were covered by overfilling the pan with soil and striking it level. The application of herbicide was made by spraying the surface of the soil with an acetone solution of the thiooxanilonitrile at a concentration equivalent to an application rate of 25 lbs. per acre.

The planted pans were maintained on a greenhouse bench under ordinary conditions of sunlight and watering for approximately 14 days. The herbicidal activity was measured according to the followng scale:

0=no phytotoxicity
1=slight phytotoxicity
2=moderate phytotoxicity
3=severe phytotoxicity The numbered compositions appearing in the table below refer to the compositions prepared in the examples of corresponding number.

Data obtained from tests conducted in this manner are reported in Table II.

amine salts of long-chain carboxylic acids; the sulfonated animal, vegetable and mineral oils; quaternary salts of

Table II

| Composition | Plant Type | | | | | | | | | | | | | | |
|---|---|---|---|---|---|---|---|---|---|---|---|---|---|---|---|
| | A | B | C | D | E | F | G | H | K | M | N | O | P | Q | R |
| 3 | 0 | 2 | 0 | 0 | 0 | 0 | 2 | 3 | 0 | 0 | 3 | 2 | 0 | 0 | 0 |
| 4 | 1 | 2 | 1 | 1 | 1 | 2 | 3 | 3 | 0 | 2 | 3 | 1 | 0 | 0 | 0 |
| 6 | 0 | 2 | 0 | 0 | 0 | 0 | 1 | 3 | 1 | 1 | 3 | 0 | 0 | 3 | 0 |
| 7 | 2 | 1 | 0 | 1 | 2 | 2 | 1 | 3 | 3 | 3 | 3 | 0 | 0 | 0 | 1 |
| 8 | 2 | 2 | 0 | 1 | 2 | 1 | 1 | 3 | 3 | 3 | 3 | 1 | 2 | 3 | 1 |
| 9 | 1 | 0 | 0 | 1 | 1 | 1 | 0 | 0 | 2 | — | 3 | 0 | 0 | 0 | 1 |
| 10 | 2 | 1 | 0 | 1 | 2 | 2 | 0 | 3 | 2 | 2 | 3 | 1 | 1 | 0 | 1 |
| 11 | 1 | 3 | 3 | 2 | 1 | 2 | 2 | 3 | 1 | — | 3 | 0 | 2 | 2 | 2 |

The herbicidally active compounds of this invention are solid materials. To aid in achieving a uniform distribution of the active compounds over the entire area of the soil or plants to be treated, it is often advantageous to employ a composition comprising a diluent or extendagent in addition to the actual compounds. Suitable solid extending agents are those which render the compositions permanently dry and free-flowing. Therefore, hygroscopic materials are not preferred extending agents unless there is included in the composition a separate substance to aid flowability. Effective solid diluents include natural clays, such as china clays, bentonites, and the attapulgites. Other minerals in their natural state such as talc, pyrophylite, quartz, diatomaceous earth, Fuller's earth, chalk, rock phosphate, and sulfur; are chemically modified minerals, such as acid-washed bentonite, precipitated calcium phosphate, precipitated calcium carbonate, and colloidal silica. These diluents may represent a substantial portion, e.g. 50 to 98% by weight, of the entire formulation as applied to plant or soil. Formulations more concentrated with respect to the active ingredient may be prepared by they will usually require additional dilution by the user in order to properly prepare the composition for the most effective usage. Therefore, the toxicant formulation as applied in the field will normally consist of a minor amount, i.e. less than 50% by weight of the entire formulation, of the thiooxanilonitriles and a major amount, or more than 50%, of the entire formulation, of an adjuvant or adjuvants.

Liquid extending agents are also useful in the practice of this invention. The thiooxanilonitriles of this invention are insoluble in water but are readily soluble in most organic solvents. Therefore the choice of a liquid extending agent is quite variable if a solution of the active ingredients is desired. In addition, the active compounds need not be dissolved but merely dispersed in the extending agent in the form of a suspension or emulsion. One method of forming this dispersion is to dissolve the thiooxanilonitriles in a suitable organic solvent and then add this solution to water or some other liquid extending agent to form the dispersion. Examples of some organic solvents suitable for use as extending agents when a solution is desired include: alcohols such as etheyl, isopropyl, n-propyl, and butyl alcohols; ketones such as acetone, methylethyl ketone, and cyclohexanone; and aromatic hydrocarbons such as benzene, toluene, xylene and cumene. Solvents useful as extending agents when a dispersion of the active compound in the solvent is acceptable include: water, hexane, and other aliphatic hydrocarbons.

The incorporation of a surface active agent into the herbicidal formulation is an aid helpful in forming uniform dispersions or emulsions of the active thiooxanilonitriles in water. The surface active agent, that is the wetting, emulsifying, or dispersion agent, may be either anionic, cationic, non-ionic, or mixtures thereof. Suitable wetting agents are the organic compounds capable of lowering the surface tension of water and include the conventional soaps such as the water-soluble salts of long-chain carboxylic acids; the amino soaps, such as the high molecular weight acids; rosin soaps such as salts of abietic acid; sulfuric acid salts of high molecular weight organic compounds; algin soaps; and simple and polymeric compositions having both hydrphobic and hydrophilic functions.

The concentrated compositions of this invention ordinarily have the active ingredient in the surface active agent present in higher concentrations than the toxicant compositions applied in the field, so that upon dilution with an extending agent, compositions containing optimum proportions of active ingredient and surface active agent are prepared to obtain uniform distribution and to maintain the active ingredients in a form enabling prompt assimilation by the plants.

The concentrate compositions of this invention preferably comprise 5% to 95% by weight of the active ingredient, the remainder consisting of the adjuvant. If a liquid concentrate is desired, this adjuvant may be solely liquid extending agent or surface active agent, but preferably is a combination of the two. Preferably the surface active agent comprises from 0.1% to 15% of the concentrate, and the liquid extender comprises from 5% to 95% of the concentrate. If a solid concentrate is desired, the adjuvant is usually made up solely of a solid extender unless the dust concentrate is to be applied as a wettable powder, in which case an amount of surface active agent comparable to that used in the liquid formulation, that is 0.1% to 15%, may be desirable.

Carrier materials or diluents necessary to dilute the concentrates to a toxicological level suitable for plant control can be either a liquid or particulate solid. Materials mentioned previously as extenders can also be used as carriers; however the use of some of these materials as carriers is often not economically feasible. Water is a preferred liquid carrier; suitable solid carriers include solid fertilizers such as ammonium nitrate, urea, and super phosphate, as well as other materials in which plant organisms may take root and grow, such as compost, manure, humus and sand.

In addition to the above described conditioning agents, other adjuvants may be added, such as insecticides, fungicides, nematocides and other herbicides of a supplementary nature. This may be done when it is desired to broaden the spectrum of activity to include insects, fungi, or other problem weeds.

The herbicidal compositions of this invention are applied to the plant systems in the conventional manner. Thus, the dust and liquid compostiions may be applied to the foliage of growing plants or to the soil by the use of power-operated dusters and sprayers as well as manually operated devices. Dust compositions sprinkled on the surface of the soil can be distributed below the surface by the usual discing, dragging or mixing operations.

The application of a toxic amount of the thiooxanilonitriles to the area to be controlled is essential to the practice of this invention. The exact dosage to be applied is dependent not only upon the specific thiooxanilonitrile but also upon the particular type of protection desired. As a general rule, the contact herbicidal activity of the thiooxanilonitriles is the most significant and the pre-emergence activity is usually somewhat less pronounced. Contact herbicidal activity is usually achieved by application of the thiooxanilonitriles at a rate of from 0.5 to 10 lbs. per acre. However, lower rates of application can be employed, particularly if a herbicidally selective activity is desired. Pre-emergence herbicidal activity is usually achieved at rates about 25 lbs. per acre.

Although the invention has been described in terms of specified embodiments which are set forth in considerable detail, it should be understood that this was done for illustrative purposes only, and that the invention is not necessarily limited thereto since alternative embodiments will become apparent to those skilled in the art in view of this disclosure. For instance, it will be apparent to a skilled artisan that the toxic activity reported herein in certain plant species is indicative of toxic activity in various related species not specifically shown. Accordingly, this and other modifications are contemplated which can be made without departing from the spirit of the described invention.

What is claimed is:

1. A herbicidal concentrate composition comprising a herbicidal adjuvent and, as an essential active ingredient, present in a phytotoxic amount a compound of the formula

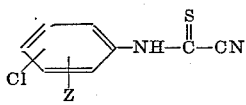

where Z is chloro or alkyl having from one to four carbon atoms.

2. A method of inhibiting the growth of existing plant systems comprising contact the foliage of said plant systems with a phytotaxis amount of a compound of the formula

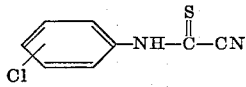

3. A method of inhibiting the growth of existing plant systems comprising contacting the foliage of said plant systems with a phytotoxic amount of a compound of the formula

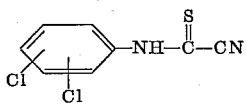

4. A method of inhibiting the growth of existing plant systems comprising contacting the foliage of said plant systems with a phytotoxic amount of a compound of the formula

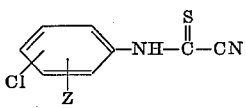

where Z is an alkyl radical having from one to four carbon atoms.

5. A method of inhibiting the growth of existing plant systems comprising contacting the foliage of said plant systems with a phytotoxic amount of a compound of the formula

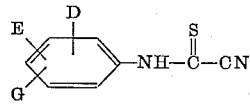

where D is selected from the group consisting of hydrogen, chloro, and alkyl having from one to four carbon atoms, E is selected from the group consisting of hydrogen, chloro, nitro and alkyl having from one to four carbon atoms, and G is selected from the group consisting of hydrogen, hydroxy, and alkoxy having from one to four carbon atoms.

6. A method according to claim 5 wherein said compound is 2-tert-butyl-6-methylthiooxanilonitrile.

7. A method according to claim 5 wherein said compound is 4-methoxy-2-nitrothiooxanilonitrile.

8. A method according to claim 5 wherein said compound is 2,5-dichlorothiooxanilonitrile.

9. A method according to claim 5 wherein said compound is 3,5-dichlorothiooxanilonitrile.

10. A method according to claim 5 wherein said compound is 3,5-dichloro-4-hydroxythiooxanilonitrile.

11. A method according to claim 5 wherein said compound is 2,3-dichlorothiooxanilonitrile.

12. A method according to claim 5 wherein said compound is 3-chloro-2-methylthiooxanilonitrile.

13. A method of inhibiting the growth of existing plant systems comprising contacting the foliage of said plant systems with a phytotoxic amount of 2-methoxy-3,4,5,6-tetrachlorothiooxanilonitrile.

14. A method for protecting desirable plant growth comprising applying to a location where desirable plant growth is or will be growing, a compound of the formula

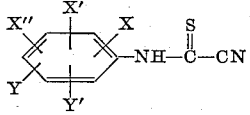

where X, X' and X'' are selected from the group consisting of hydrogen and halogen, and Y and Y' are selected from the group consisting of hydrogen, alkyl, alkoxy, halogen and nitro, in an amount phytotoxic to undesirable plants.

References Cited by the Examiner

Karmelj et al.: Chemical Abstract, vol. 54, 22426g, 1960.

Grabenko et al.: Chemical Abstract, vol. 55, 1484f, 1961.

LEWIS GOTTS, *Primary Examiner.*

JAMES O. THOMAS, JR., *Examiner.*

A. J. ADAMCIK, *Assistant Examiner.*

UNITED STATES PATENT OFFICE
CERTIFICATE OF CORRECTION

Patent No. 3,287,102                             November 22, 1966

John F. Olin

It is hereby certified that error appears in the above numbered patent requiring correction and that the said Letters Patent should read as corrected below.

Column 1, line 10, for "heribicidal" read -- herbicidal --; column 4, line 7, for "metling" read -- melting --; line 38, for "C, 50.18;" read -- C, 50.18%; --; line 69, for "C, 48.86" read -- C, 48.86% --; line 71, for "C, 48.79" read -- C, 48.79% --; column 7, line 21, for "extend-" read -- extending --; line 31, for "are" read -- and --; line 38, for "by" read -- but --; line 59, for "etheyl" read -- ethyl --; column 8, line 20, for "hydrphobic" read -- hydrophobic --; column 9, line 26, for "adjuvent" read -- adjuvant --; line 37, for "contact" read -- contacting --; line 38, for "phytotaxis" read -- phytotoxic --.

Signed and sealed this 12th day of September 1967.

(SEAL)
Attest:

ERNEST W. SWIDER                            EDWARD J. BRENNER
Attesting Officer                          Commissioner of Patents